United States Patent
Karayianni et al.

(10) Patent No.: US 9,934,883 B2
(45) Date of Patent: Apr. 3, 2018

(54) HALOGEN FREE FLAME RETARDANT THERMOPLASTIC ELASTOMER COMPOSITIONS HAVING IMPROVED INSULATION RESISTANCE

(71) Applicant: E I DU PONT DE NEMOURS AND COMPANY, Wilmington, DE (US)

(72) Inventors: Eleni Karayianni, Geneva (CH); Judith Alison Peacock, Vaud (CH)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 899 days.

(21) Appl. No.: 13/910,414

(22) Filed: Jun. 5, 2013

(65) Prior Publication Data

US 2013/0327558 A1    Dec. 12, 2013

Related U.S. Application Data

(60) Provisional application No. 61/656,226, filed on Jun. 6, 2012.

(51) Int. Cl.

| | |
|---|---|
| *H01B 3/42* | (2006.01) |
| *H01B 7/295* | (2006.01) |
| *C08L 67/02* | (2006.01) |
| *C08K 5/523* | (2006.01) |
| *C08K 5/5313* | (2006.01) |
| *C08L 63/00* | (2006.01) |

(52) U.S. Cl.
CPC ............. *H01B 3/422* (2013.01); *C08K 5/523* (2013.01); *C08K 5/5313* (2013.01); *C08L 63/00* (2013.01); *C08L 67/025* (2013.01); *H01B 7/295* (2013.01); *H01B 3/427* (2013.01)

(58) Field of Classification Search
CPC .................................................. C08K 5/0066
See application file for complete search history.

(56) References Cited

U.S. PATENT DOCUMENTS

| | | | |
|---|---|---|---|
| 3,651,014 A * | 3/1972 | Witsiepe | C08G 63/672 528/274 |
| 3,723,569 A | 3/1973 | Hoeschele | |
| 4,180,496 A | 12/1979 | Yanagimoto et al. | |
| 6,242,560 B1 * | 6/2001 | Gyobu | C08G 63/672 528/176 |
| 6,255,371 B1 | 7/2001 | Schlosser et al. | |
| 6,363,071 B1 | 4/2002 | Jenewein et al. | |
| 6,547,992 B1 | 4/2003 | Schlosser et al. | |
| 6,716,899 B1 | 4/2004 | Klatt et al. | |
| 7,700,680 B2 | 4/2010 | Costanzi et al. | |
| 2004/0192812 A1 * | 9/2004 | Engelmann | C08K 5/17 524/100 |
| 2008/0023887 A1 * | 1/2008 | Vollenberg | C08J 11/24 264/500 |
| 2008/0039571 A1 | 2/2008 | Cohoon et al. | |
| 2012/0083553 A1 | 4/2012 | Wakatsuka et al. | |

FOREIGN PATENT DOCUMENTS

| | | |
|---|---|---|
| EP | 1883081 A1 | 1/2008 |
| JP | 9143350 A | 6/1997 |
| WO | 2008014254 A2 | 1/2008 |
| WO | 2009047353 A1 | 4/2009 |
| WO | 2010094560 A1 | 8/2010 |

OTHER PUBLICATIONS

Database WPI Week 201005 Thomson Scientific, London, GB; AN 2009-L10826 XP002717620, & KR 2009 0066379A (LG Chem Ltd) Jun. 24, 2009 (Jun. 24, 2009) abstract.
Database WPI Week 200425 Thomson Scientific, London, GB; AN 2004-260863 XP002717621 & JP 2004 010694 A (Mitsubishi Eng Plastics KK) Jan. 15, 2004 abstract.

* cited by examiner

*Primary Examiner* — Peter F Godenschwager

(57) ABSTRACT

Halogen-free flame retardant compositions comprising copolyetherester thermoplastic elastomers, melamine cyanurate and epoxy-containing compounds and cables and wires made from such flame retardant polymer composition provide good electrical insulation resistance during use.

12 Claims, No Drawings

HALOGEN FREE FLAME RETARDANT THERMOPLASTIC ELASTOMER COMPOSITIONS HAVING IMPROVED INSULATION RESISTANCE

CROSS REFERENCE TO RELATED APPLICATIONS

This application claims the benefit of U.S. Provisional Application No. 61/656,226, filed Jun. 6, 2012, now pending, the entire disclosure of which is incorporated herein by reference.

FIELD OF THE INVENTION

The present invention relates to the field of halogen free flame retardant compositions comprising thermoplastic elastomers and to their uses in cables and wires.

BACKGROUND OF THE INVENTION

Due to excellent mechanical properties (e.g., elongation at break, tear strength, tensile strength, flex life, and abrasion resistance), polymeric compositions based on copolyetherester elastomers have been used in a wide range of applications including manufacture of articles for use in the automotive, wire and cable, fluid power, electrical/electronic, hose and tubing, and appliance fields.

In particular, copolyetherester elastomers are used in the manufacture of insulating layers for wire and cable applications in the automotive, building and construction industries. The wire and cable coating provides electrical insulation but also imparts mechanical, chemical and physical protection. Because temperatures in excess of 125° C. are often reached in the underhood compartments of automobiles or within buildings, temperature specifications for wire and cable insulation materials in both dry and humid environment conditions are constantly increasing. Further, in these highly demanding applications it is necessary that the insulation material meet additional requirements including flame retardancy, thermal resistance, hydrolysis resistance and high elongation.

Polyvinyl chloride (PVC) is the most widely used material for wire and cable insulation. However, in many instances, PVC is perceived as an environmental threat. It would be desirable to have an alternative halogen-free flame retardant thermoplastic material available for use in wire and cable applications that require a flexible material that exhibits resistance to high temperature and hydrolysis as an alternative wire and cable insulation material.

Various flame retardant systems have been developed and used in polymeric material, e.g., polyesters, to improve the fire-resistance thereof. However, due to toxicity concerns, halogen-free flame retardants are gaining increased attention. Among the various halogen-free flame retardants, phosphorus compounds (such as salts of phosphinic or diphosphinic acids) are used extensively due to their stability and flame retardant effectiveness. Prior art has also demonstrated that various types of synergistic compounds can be used in combination with the phosphorus compounds to further maximize the flame retardant effectiveness thereof. For example, U.S. Pat. No. 6,547,992 discloses the use of synthetic inorganic compounds such as oxygen compounds of silicon, magnesium compounds, metal carbonates of metals of the second main group of the periodic table, red phosphorus, zinc compounds, aluminum compounds, or combinations thereof as flame retardant synergists; U.S. Pat. No. 6,716,899 discloses the use of organic phosphorus-containing compounds as flame retardant synergists; U.S. Pat. No. 6,365,071 discloses the use of nitrogen-containing compounds (e.g., melamine cyanurate, melamine phosphate, melamine pyrophosphate, or melamine diborate) as flame retardant synergists; and U.S. Pat. No. 6,255,371 discloses the use of reaction products of phosphoric acids with melamine or condensed product of melamine (e.g., melamine polyphosphate (MPP)) as flame retardant synergists. Moreover, U.S. Patent Publication No. 2008/0039571 discloses the use of metal hydroxides, antimony compounds, boron compounds, phosphorous compounds (e.g., organic phosphate esters, phosphates, halogenated phosphorus compounds, inorganic phosphorus containing salts, etc.), or other metal compounds as primary flame retardants or flame retardant synergists.

Particularly, European Patent Publication No. EP1883081 and PCT Patent Publication Nos. WO2009/047353 and WO2010/094560 each disclose flame retardant elastomeric compositions useful in forming insulating layers and/or jackets of wires and cables. In those disclosures, combinations of (i) a metal salt of a phosphinic acid and/or a diphosphinic acid, (ii) a nitrogen containing compound (e.g., melamine polyphosphate), and (iii) an inorganic compound (e.g., zinc borate) are taught as preferred flame retardant packages. It has been known in the art that the presence of high levels of additives, such as flame retardant additives, in polymer compositions may cause deterioration of certain properties. It is desirable that such polymer compositions have low flammability, high thermal stability and good electrical insulation properties while still maintaining other mechanical properties.

It is an object of the present invention to provide compositions and wires and cables made thereof that exhibit good mechanical performance, good flame retardance and good electrical insulation resistance under dry as well as hot and humid conditions.

SUMMARY OF THE INVENTION

The present invention is directed to flame retardant polymer compositions comprising:
  a) one or more copolyetherester thermoplastic elastomers;
  b) melamine cyanurate;
  c) at least one epoxy-containing compound; and
  d) optionally at least one compound selected from the group consisting of phosphites, aromatic phosphate ester flame retardants and mixtures thereof;
    with the proviso that i) when the flame retardant polymer composition comprises an aromatic phosphate ester flame retardant and a phosphite, the amount of epoxy-containing compound present is such that the total epoxy functional group equivalent weight is at least about 32 milliequivalents per kg of the combined weight of the one or more copolyetherester thermoplastic elastomers and the aromatic phosphate ester flame retardant and ii) when the flame retardant polymer composition comprises an aromatic phosphate ester flame retardant in the absence of phosphite, the amount of epoxy-containing compound present is such that the total epoxy functional group equivalent weight is at least about 56 milliequivalents per kg of the combined weight of the one or more copolyetherester thermoplastic elastomers and the aromatic phosphate ester flame retardant.

In a preferred embodiment, the flame retardant polymer composition consists of:
a) one or more copolyetherester thermoplastic elastomers,
b) an amount of melamine cyanurate that is at least from at or equal to 10 weight percent based on the total weight of the flame retardant polymer composition;
c) one or more epoxy compounds; and optionally
d) 0 to 2 weight percent based of the total weight of the flame retardant polymer composition of a phosphite,
e) 0 to 15 weight percent based on the total weight of the flame retardant polymer composition of an aromatic phosphate ester flame retardant, with the proviso that i) when the flame retardant polymer composition comprises an aromatic phosphate ester flame retardant and a phosphite, the amount of epoxy-containing compound present is such that the total epoxy functional group equivalent weight is at least about 32 milliequivalents per kg of the combined weight of the one or more copolyetherester thermoplastic elastomers and the aromatic phosphate ester flame retardant and ii) when the flame retardant polymer composition comprises an aromatic phosphate ester flame retardant in the absence of phosphite, the amount of epoxy-containing compound present is such that the total epoxy functional group equivalent weight is at least about 56 milliequivalents per kg of the combined weight of the one or more copolyetherester thermoplastic elastomers and the aromatic phosphate ester flame retardant. and
f) from 0.05 to 10 weight percent based on the total weight of the flame retardant polymer composition of additives
wherein the sum of components a) to f) amounts to 100 weight percent.

Preferably, the additives used in the flame retardant polymer compositions of the present invention are selected from the group consisting of stabilizers, processing agents, metal deactivators, antioxidants, UV stabilizers, heat stabilizers, dyes and/or pigments.

Preferably, the amount of melamine cyanurate b) present in the flame retardant polymer composition of the present invention is from at or about 10 to 30 weight percent based on the total weight of the flame retardant polymer composition and the amount of epoxy-containing compound c) present in the flame retardant polymer composition of the present invention is such that it provides from at or about 2.4 to about 10 milliequivalents of total epoxy functionality based on hundred grams of the total weight of the flame retardant polymer composition.

In a preferred embodiment, the flame retardant polymer composition of the present invention further comprises phosphites and/or aromatic phosphate esters wherein the amount of phosphite d) is from at or about 0.1 to 1 weight percent based on the total weight of the flame retardant polymer composition and wherein the amount of aromatic phosphate ester e) is from at or about 2 to 12 weight percent based on the total weight of the flame retardant polymer composition.

The preferred epoxy-containing compound c) used in the flame retardant polymer composition of the present invention is selected from the group consisting of 2,2-bis(4-hydroxyphenyl)propane-epichlorohydrin copolymers, tetraglycidyl ethers of tetraphenol ethane and combinations thereof.

The preferred phosphite d) used in the flame retardant polymer composition of the present invention is a pentaerythritol diphosphite.

The preferred aromatic phosphate ester flame retardant e) used in the flame retardant polymer composition of the present invention is selected from the group consisting of resorcinol bis(di-2,6-dimethylphenyl phosphate) and bisphenol bis(di-2,6-dimethylphenyl phosphate) and combination thereof.

Also described herein are wires or cables comprising a coating made of the flame retardant polymer compositions of the present invention and the use of the flame retardant polymer compositions of the present invention for making an insulated wire and/or cable.

DETAILED DESCRIPTION OF THE INVENTION

The following definitions are to be used to interpret the meaning of the terms discussed in the description and recited in the claims.

As used herein, the article "a" indicates one as well as more than one and does not necessarily limit its referent noun to the singular.

As used herein, the terms "about" and "at or about" mean that the amount or value in question may be the value designated or some other value that is approximately or about the same. The phrase is intended to convey that similar values promote equivalent results or effects according to the invention.

The one or more copolyetherester thermoplastic elastomers suitable for use in the flame retardant compositions described herein are preferably present in the compositions of the invention in an amount from at or about 50 to at or about 80 weight percent, the weight percentage being based on the total weight of the flame retardant polymer composition.

Copolyetherester thermoplastic elastomers of the present invention have a multiplicity of recurring long-chain ester units and short-chain ester units joined head-to-tail through ester linkages, said long-chain ester units being represented by formula (A):

and said short-chain ester units being represented by formula (B):

wherein
G is a divalent radical remaining after the removal of terminal hydroxyl groups from poly(alkylene oxide)glycols having a number average molecular weight of between about 400 and about 6000, or preferably between about 400 and about 3000;
R is a divalent radical remaining after removal of carboxyl groups from a dicarboxylic acid having a molecular weight of less than about 300;
D is a divalent radical remaining after removal of hydroxyl groups from a dial having a molecular weight less than about 250.

As used herein, the term "long-chain ester units" as applied to units in a polymer chain refers to the reaction product of a long-chain glycol with a dicarboxylic acid. Suitable long-chain glycols are poly(alkylene oxide) glycols having terminal (or as nearly terminal as possible) hydroxy groups and having a number average molecular weight of from about 400 to about 6000, and preferably from about 600 to about 3000. Preferred poly(alkylene oxide) glycols include poly(tetramethylene oxide) glycol, poly(trimethylene oxide) glycol, poly(propylene oxide) glycol, poly(ethylene oxide) glycol, copolymer glycols of these alkylene oxides, and block copolymers such as ethylene oxide-capped poly(propylene oxide) glycol. Mixtures of two or more of these glycols can be used.

As used herein, the term "short-chain ester units" as applied to units in a polymer chain of the copolyetheresters refers to low molecular weight compounds or polymer chain units having molecular weights less than about 550. They are made by reacting a low molecular weight diol or a mixture of dials (molecular weight below about 250) with a dicarboxylic acid to form ester units represented by Formula (B) above. Included among the low molecular weight dials which react to form short-chain ester units suitable for use for preparing copolyetheresters are acyclic, alicyclic and aromatic dihydroxy compounds. Preferred compounds are dials with about 2-15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, and the like. Especially preferred dials are aliphatic dials containing 2-8 carbon atoms, and a more preferred diol is 1,4-butanediol. Included among the bisphenols which can be used are bis(p-hydroxy)diphenyl, bis(p-hydroxyphenyl)methane, and bis(p-hydroxyphenyl)propane. Equivalent ester-forming derivatives of dials are also useful (e.g., ethylene oxide or ethylene carbonate can be used in place of ethylene glycol or resorcinol diacetate can be used in place of resorcinol).

As used herein, the term "dials" includes equivalent ester-forming derivatives such as those mentioned. However, any molecular weight requirements refer to the corresponding dials, not their derivatives.

Dicarboxylic acids that can react with the foregoing long-chain glycols and low molecular weight dials to produce the copolyetheresters are aliphatic, cycloaliphatic or aromatic dicarboxylic acids of a low molecular weight, i.e., having a molecular weight of less than about 300. The term "dicarboxylic acids" as used herein includes functional equivalents of dicarboxylic acids that have two carboxyl functional groups that perform substantially like dicarboxylic acids in reaction with glycols and dials in forming copolyetherester polymers. These equivalents include esters and ester-forming derivatives such as acid halides and anhydrides. The molecular weight requirement pertains to the acid and not to its equivalent ester or ester-forming derivative.

Thus, an ester of a dicarboxylic acid having a molecular weight greater than 300 or a functional equivalent of a dicarboxylic add having a molecular weight greater than 300 are included provided the corresponding acid has a molecular weight below about 300. The dicarboxylic acids can contain any substituent groups or combinations that do not substantially interfere with copolyetherester polymer formation and use of the copolyetherester polymer in the flame retardant compositions of the invention.

As used herein, the term "aliphatic dicarboxylic acids" refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

As used herein, the term "aromatic dicarboxylic acids" refer to dicarboxylic acids having two carboxyl groups each attached to a carbon atom in a carbocyclic aromatic ring structure. It is not necessary that both functional carboxyl groups be attached to the same aromatic ring and where more than one ring is present, they can be joined by aliphatic or aromatic divalent radicals or divalent radicals such as —O— or —$SO_2$—. Representative useful aliphatic and cycloaliphatic acids that can be used include sebacic acid; 1,3-cyclohexane dicarboxylic acid; 1,4-cyclohexane dicarboxylic acid; adipic acid; glutaric acid; 4-cyclohexane-1,2-dicarboxylic acid; 2-ethylsuberic acid; cyclopentanedicarboxylic acid, decahydro-1,5-naphthylene dicarboxylic acid; 4,4'-bicyclohexyl dicarboxylic acid; decahydro-2,6-naphthylene dicarboxylic acid; 4,4'-methylenebis(cyclohexyl)carboxylic acid; and 3,4-furan dicarboxylic acid. Preferred acids are cyclohexane dicarboxylic acids and adipic acid.

Representative aromatic dicarboxylic acids include phthalic, terephthalic and isophthalic acids; bibenzoic acid; substituted dicarboxy compounds with two benzene nuclei such as bis(p-carboxyphenyl)methane; p-oxy-1,5-naphthalene dicarboxylic acid; 2,6-naphthalene dicarboxylic acid; 2,7-naphthalene dicarboxylic acid; 4,4'-sulfonyl dibenzoic acid and $C_1$-$C_{12}$ alkyl and ring substitution derivatives thereof, such as halo, alkoxy, and aryl derivatives. Hydroxy acids such as p-(beta-hydroxyethoxy)benzoic acid can also be used provided an aromatic dicarboxylic acid is also used.

Aromatic dicarboxylic acids are a preferred class for preparing the copolyetherester elastomers useful for this invention. Among the aromatic acids, those with 8-16 carbon atoms are preferred, particularly terephthalic acid alone or with a mixture of phthalic and/or isophthalic acids.

The copolyetherester elastomer preferably comprises from at or about 15 to at or about 99 weight percent short-chain ester units corresponding to Formula (B) above, the remainder being long-chain ester units corresponding to Formula (A) above. More preferably, the copolyetherester elastomers comprise from at or about 20 to at or about 95 weight percent, and even more preferably from at or about 50 to at or about 90 weight percent short-chain ester units, where the remainder is long-chain ester units. More preferably, at least about 70% of the groups represented by R in Formulae (A) and (B) above are 1,4-phenylene radicals and at least about 70% of the groups represented by D in Formula (B) above are 1,4-butylene radicals and the sum of the percentages of R groups which are not 1,4-phenylene radicals and D groups that are not 1,4-butylene radicals does not exceed 30%. If a second dicarboxylic acid is used to prepare the copolyetherester, isophthalic acid is preferred and if a second low molecular weight diol is used, ethylene glycol, 1,3-propanediol, cyclohexanedimethanol, or hexamethylene glycol are preferred.

A blend or mixture of two or more copolyetherester elastomers can be used. The copolyetherester elastomers used in the blend need not on an individual basis come within the values disclosed hereinbefore for the elastomers. However, the blend of two or more copolyetherester elastomers must conform to the values described herein for the copolyetheresters on a weighted average basis. For example, in a mixture that contains equal amounts of two copolyetherester elastomers, one copolyetherester elastomer can contain 60 weight percent short-chain ester units and the other resin can contain 30 weight percent short-chain ester units for a weighted average of 45 weight percent short-chain ester units.

Preferred copolyetherester elastomers include, but are not limited to, copolyetherester elastomers prepared from monomers comprising (1) poly(tetramethylene oxide) glycol; (2) a dicarboxylic acid selected from isophthalic acid, terephthalic acid and mixtures thereof; and (3) a diol selected from 1,4-butanediol, 1,3-propanediol and mixtures thereof, or from monomers comprising (1) poly(trimethylene oxide) glycol; (2) a dicarboxylic acid selected from isophthalic acid, terephthalic acid and mixtures thereof; and (3) a diol selected from 1,4-butanediol, 1,3-propanediol and mixtures thereof, or from monomers comprising (1) ethylene oxide-capped poly(propylene oxide) glycol; (2) a dicarboxylic acid selected from isophthalic acid, terephthalic acid and mixtures thereof; and (3) a dial selected from 1,4-butanediol, 1,3-propanediol and mixtures thereof.

Preferably, the copolyetherester elastomers described herein are prepared from esters or mixtures of esters of terephthalic acid and/or isophthalic acid, 1,4-butanediol and poly(tetramethylene ether)glycol or poly(trimethylene ether) glycol or ethylene oxide-capped polypropylene oxide glycol, or are prepared from esters of terephthalic acid, e.g. dimethylterephthalate, 1,4-butanediol and poly(ethylene oxide)glycol. More preferably, the copolyetheresters are prepared from esters of terephthalic acid, e.g. dimethylterephthalate, 1,4-butanediol and poly(tetramethylene ether) glycol.

In a preferred embodiment, the flame retardant polymer compositions according to the present invention comprise copolyetherester elastomers prepared from monomers comprising (1) poly(tetramethylene oxide) glycol or poly(trimethylene oxide) glycol and mixtures thereof; (2) a dicarboxylic acid selected from the group consisting of isophthalic acid, terephthalic acid and mixtures thereof; and (3) a diol selected from the group consisting of 1,4-butanediol, 1,3-propanediol and mixtures thereof.

More preferably, the flame retardant polymer compositions according to the present invention comprise copolyetherester elastomers prepared from monomers comprising (1) poly(tetramethylene oxide) glycol; (2) a dicarboxylic acid selected from the group consisting of terephthalic acid; and (3) a diol selected from the group consisting of 1,4-butanediol, 1,3-propanediol and mixtures thereof and wherein the level of poly(tetramethylene oxide) glycol is less than about 25 weight percent based on the total weight of the copolyetherester elastomers.

In another embodiment, the flame retardant polymer compositions according to the present invention comprise a blend of at least one copolyetherester elastomer prepared from monomers comprising (1) poly(tetramethylene oxide) glycol; (2) a dicarboxylic acid selected from the group consisting of terephthalic acid; and (3) a did selected from the group consisting of 1,4-butanediol, 1,3-propanediol and mixtures thereof and wherein the level of poly(tetramethylene oxide) glycol is less than about 25 weight percent based on the total weight of the copolyetherester elastomers, and of at least one copolyetherester thermoplastic elastomer prepared from monomers comprising (1) poly(tetramethylene oxide) glycol; (2) a dicarboxylic acid selected from the group consisting of mixtures of isophthalic acid and terephthalic acid; and (3) a diol selected from the group consisting of 1,4-butanediol, 1,3-propanediol and mixtures thereof and wherein the level of said copolyetherester elastomer is from about 5 to about 50 weight percent based on the total weight of the copolyetherester elastomers.

As a result of their excellent tear strengths, tensile strengths, flex lives, abrasion resistances, and broad useful end-use temperature ranges, thermoplastic copolyetherester elastomers are used in a wide range of applications including for example wire and cable coatings, automotive applications, components for household appliances, components for buildings or mechanical devices and tubes and pipes for conveying fluids. Examples of suitable copolyetherester elastomers are commercially available under the trademark Hytrel® copolyetherester elastomer from E. I. du Pont de Nemours and Company, Wilmington, Del.

The flame retardant polymer compositions of the invention also comprise melamine cyanurate.

Melamine cyanurate, also known as melamine-cyanuric acid adduct or melamine-cyanuric acid complex, is a crystalline complex formed from a 1:1 mixture of melamine and cyanuric acid. Melamine cyanurate is the commonly used name for adducts of 2,4,6-triamino-1,3,5-triazine (melamine) and 2,4,6-trihydroxy-1,3,5-triazine or its tautomer ((iso)cyanuric acid) as described for example in U.S. Pat. No. 4,180,496.

Preferably, the amount of melamine cyanurate present in the flame retardant polymer composition of the present invention is higher than or equal to 10 weight percent based on the total weight of the flame retardant polymer composition. Lower amounts of melamine cyanurate may not be effective enough to impart flame retardance to the polymer composition. More preferably, the amount of melamine cyanurate present in the flame retardant polymer composition of the present invention is from 10 to 30 weight percent, even more preferably from 15 to 25 weight percent, the weight percent being based on the total weight of the flame retardant polymer composition. Amounts higher than 30 weight percent may detrimental to the mechanical properties of the flame retardant polymer composition.

In contrast to many flame retardant polymer compositions described in the art, the flame retardant polymer compositions of the present invention are free of organic or inorganic phosphinate flame retardant derivatives such as those described in U.S. Pat. No. 6,255,371 (e.g. aluminium diethylphosphinate) and in U.S. Pat. No. 7,700,680 (e.g. aluminium phosphinate).

The flame retardant polymer compositions of the present invention comprise one or more epoxy-containing compounds. Examples of suitable epoxy-containing compounds include without limitation epoxy-containing polyolefins, other epoxy-containing polymers, glycidyl ethers of polyphenols, bisphenol epoxy resins and epoxy novolac resins.

Epoxy-containing polyolefins are polyolefins, preferably polyethylene, that are functionalized with epoxy-containing groups. As used herein, the term "functionalized with epoxy-containing groups" refers to the fact that the epoxy-containing groups are grafted onto the polyolefin and/or copolymerized with the olefin comonomer.

One class of epoxy-containing polyolefin useful in the practice of the invention comprises copolymers of an olefin comonomer and a comonomer that contains an epoxy-containing group. Examples of suitable comonomers include unsaturated epoxides comprising from four to eleven carbon atoms, such as glycidyl (meth)acrylate, allyl glycidyl ether, vinyl glycidyl ether and glycidyl itaconate. Glycidyl (meth)acrylates (GMA) are particularly preferred copolymerizable monomers. By (meth)acrylate is meant herein that the compound may be either an acrylate, a methacrylate, or a mixture of the two. Ethylene/glycidyl (meth)acrylate copolymers may further contain copolymerized units of vinyl acetate or an alkyl (meth)acrylate having from one to six carbon atoms and an α-olefin having 1-8 carbon atoms. Representative alkyl (meth)acrylates include methyl (meth) acrylate, ethyl (meth)acrylate, propyl (meth)acrylate, butyl (meth)acrylate, isobutyl (meth)acrylate, hexyl (meth)acrylate, or combinations of these. Of note are ethyl acrylate and butyl acrylate.

It is preferred that the epoxy-containing polyolefins, when used, contain about 0.5 to about 20 weight percent of repeat units derived from monomers containing epoxy functional groups, preferably about 1.0 to about 10 weight percent, based on the weight of the epoxy-containing polyolefin. There may be more than one type of repeat unit derived from functionalized monomer present in the epoxy-containing polyolefin.

Polymers other than the above-described epoxy-containing olefin copolymers are also useful in the practice of the invention. For example, graft polymers which contain epoxy functional groups are well-known materials. They may comprise unsaturated epoxides comprising from four to eleven carbon atoms, such as glycidyl (meth)acrylate, allyl glycidyl ether, vinyl glycidyl ether and glycidyl itaconate, glycidyl (meth)acrylates (GMA) being particularly preferred. Such unsaturated epoxides are usually "attached" to the polymer by reacting the epoxy-containing compounds with an existing polymer, (i.e. grafting small molecules onto an already existing polymer). Such unsaturated expoxides may also be incorporated into a polymer by copolymerizing monomers containing the desired functional group when the polymer molecules are prepared by copolymerization. As an example of grafting, glycidyl methacrylate may be grafted onto a hydrocarbon rubber. The resulting grafted polymer has epoxy functional groups attached to it. The epoxy-containing polymers may also be thermoplastic acrylic polymers that contain copolymerized epoxy group-containing comonomers or grafted epoxy-containing molecules. Such thermoplastic acrylic polymers are often prepared by polymerizing acrylic acid, acrylate esters (such as methyl acrylate, n-propyl acrylate, isopropyl acrylate, n-butyl acrylate, n hexyl acrylate, and n-octyl acrylate), methacrylic acid, and methacrylate esters (such as methyl methacrylate, n-propy) methacrylate, isopropyl methacrylate, n-butyl methacrylate (BA), isobutyl methacrylate, p-octyl methacrylate, glycidyl methacrylate (GMA) and the like). Copolymers derived from two or more of the forgoing types of monomers may also be used, as well as copolymers made by polymerizing one or more of the forgoing types of monomers with styrene, acrylonitrile, butadiene, isoprene, and the like. Part or all of the components in these copolymers preferably have a glass transition temperature of not higher than 0° C. Preferred monomers for the preparation of a thermoplastic acrylic polymer are methyl acrylate, n-propyl acrylate, isopropyl acrylate, n-butyl acrylate, n-hexyl acrylate, and n-octyl acrylate.

It is preferred that the epoxy group-containing thermoplastic acrylic polymer is prepared from a thermoplastic acrylic polymer that has a core-shell structure. The core-shell structure is one in which the core portion preferably has a glass transition temperature of 0° C. or less, while the shell portion preferably has a glass transition temperature higher than that of the core portion. The core portion may be grafted with silicone. The shell section may be grafted with a low surface energy substance such as silicone, fluorine, and the like. An acrylic polymer with a core-shell structure that has low surface energy substances grafted to the surface will aggregate with itself during or after mixing with the copolyetherester thermoplastic elastomer and other components of the composition described herein and can be easily uniformly dispersed in the composition.

When present, the preferred amount of epoxy-containing polyolefins and/or other epoxy-containing polymers in the flame retardant polymer composition is from at or about 0.5 to at or about 30 weight percent, or more preferably from at or about 1 to at or about 15 weight percent, the weight percentages being based on the total weight of the flame retardant polymer composition.

Other examples of suitable epoxy-containing compounds include bisphenol epoxy resins. Such resins are condensation products having epoxy functional groups and a bisphenol moiety. Examples include without limitation products obtained from the condensation of bisphenol A and epichlorohydrin and products obtained from the condensation of bisphenol F and epichlorohydrin.

Another class of suitable epoxy-containing compounds is epoxy novolac resins. These resins are condensation products of an aldehyde, such as for example formaldehyde and an aromatic hydroxyl-containing compound such as for example phenol or cresol.

A preferred epoxy-containing compound suitable for use in the composition of the invention is a diphenolic epoxy condensation polymer. As used herein, "diphenolic epoxy condensation polymer" means a condensation polymer having epoxy functional groups, preferably as end groups, and a diphenol moiety within the polymer. Such diphenolic epoxy condensation polymers are well-known to those of ordinary skill in the art. Preferred diphenolic epoxy condensation polymers include condensation polymers of epichlorohydrin with a diphenolic compound. Also preferred is a 2,2-bis(p-glycidylhydroxyphenyl)propane condensation product with 2,2-bis(p-hydroxyphenyl)propane and similar isomers. Particularly preferred is a 2,2-bis(4-hydroxyphenyl)propane-epichlorohydrin copolymer that has an epoxy functional group equivalent weight of 600-700 g/equivalent, supplied by Momentive Chemical Solutions under the tradename Epikote™ EP1002F.

Preferred epoxy-containing compounds comprise at least two epoxy groups per molecule of the compound, more preferably at least three epoxy groups per molecule of the compound, and more preferably at least four epoxy groups per molecule of the compound. Even more preferably, multifunctional epoxy-containing compounds comprise between two and four epoxy groups per molecule of the epoxy-containing compound. The epoxy groups preferably comprise glycidyl ethers, and even more preferably, glycidyl ethers of phenolic compounds. These epoxy-containing compounds may be polymeric or non-polymeric, with non-polymeric being preferred. An example of an epoxy-containing compound is a tetraglycidyl ether of tetra (parahydroxyphenyl)ethane. A particularly preferred example of a commercially available epoxy-containing compound is tetraglycidyl ether of tetraphenol ethane with a functionality of 3.5 and an epoxy functional group equivalent weight of 195-230 g/equivalent supplied under the Tradename EPON® 1031 from Momentive Specialty Chemicals, Inc. The preferred amount of the preferred epoxy-containing compounds of the invention is typically at or about 0.5 to 4 weight percent of such preferred epoxy-containing compound based on the total weight of the flame retardant polymer composition.

The preferred amount of epoxy-containing compound present in the flame retardant polymer composition of the present invention is such that it provides from at or about 2.5 to about 10 milliequivalents of total epoxy functionality based on a hundred grams of the total weight of the flame retardant polymer composition.

For each individual epoxy-containing compound present in the compositions of the invention the epoxy functional group equivalent weight is the weight of the epoxy-containing compound divided by the number of epoxy functional groups in the molecule. For each composition the total epoxy functional group equivalent weight is therefore defined by the number of "moles" or molar equivalent of epoxy functional groups per kilogram of the composition.

Apart from melamine cyanurate, the flame retardant polymer compositions of the present invention may further comprise aromatic phosphate ester flame retardants such as those described in EP 0 947 547, the disclosure of which is incorporated by reference.

Preferred aromatic phosphate ester flame retardants are selected from the group consisting of resorcinol bis(di-2,6-dimethylphenyl phosphate), described in Japanese Kokai H9-143350 and available under the tradename PX-200 from Daihachi Chemical Industry Corporation, and bisphenol bis(di-2,6-dimethylphenyl phosphate) available under the tradename PX-202 from Daihachi Chemical Industry Corporation.

When used, the preferred amount of aromatic aromatic phosphate ester flame retardant present in the flame retardant polymer composition of the present invention is lower than or equal to 15 weight percent based on the total weight of the flame retardant polymer composition. More preferably, the amount of aromatic aromatic phosphate ester flame retardant present in the flame retardant polymer composition of the present invention is from 2 to 12 weight percent based on the total weight of the flame retardant polymer composition.

The flame retardant polymer composition of the present invention may also optionally comprise a phosphite. The phosphite compounds that can be used in the flame retardant polymer composition according to the present invention may be monophosphites, diphosphites and polyphosphites.

Suitable monophosphites are, for example, trialkylphosphites, dialkylaryl phosphites, alkyldiaryl phosphites and triaryl phosphites. The aryl groups in these phosphites may be linear as well as branched, may comprise cyclic and/or aromatic groups and may also comprise hetero-atom containing substituents. The aryl groups in these phosphites may be unsubstituted aryl groups as well as substituted aryl groups, wherein the substituted aryl groups may comprise, for example, alkyl groups and/or hetero-atom containing substituents.

An example of a suitable trialkylphosphite is tri-nonyl phosphite. An example of a suitable dialkylaryl phosphite is diiso-octyl octylphenyl phosphite. An example of a suitable alkyldiaryl phosphite is diphenyl iso-octylphosphite and an example of a suitable triaryl phosphite is triphenyl phosphite.

Suitable diphosphites are, for example, biphenylene diphosphites, pentaerythritol diphosphites, 4,4'-iso-propylidenediphenol diphosphites, and dipropyleneglycol diphosphites. The phosphite groups in these diphosphites suitably comprise alkyl and for aryl groups, wherein the alkyl and aryl groups suitably are chosen from the alkyl and aryl groups mentioned above for the monophosphites.

An example of a suitable biphenylene diphosphite is tetrakis-(2,4-di-tertbutyl-phenyl)-4,4'-biphenylene diphosphites. Examples of suitable pentaerythritol diphosphites are bis(2,4-di-t-butylphenyl)pentaerythritol diphosphite and bis-(2,4-dicumylphenyl)pentaerythritol diphosphite. An example of a suitable 4,4'-iso-propylidenediphenol diphosphite is tetrakis(iso-decyl)iso-propylidenediphenol diphosphite, and an example of a suitable dipropyleneglycol diphosphite is tetraphenyl dipropyleneglycol diphosphite.

Preferably, the phosphite stabilizer is a diphosphite compound, more preferably a pentaerythritol diphosphite.

When used, the preferred amount of phosphite present in the flame retardant polymer compositions of the present invention is lower than or equal to 2 weight percent based on the total weight of the flame retardant polymer composition. More preferably, the amount of phosphite present in the flame retardant polymer composition of the present invention is from 0.1 to 1 weight percent based on the total weight of the flame retardant polymer composition.

When an aromatic phosphate ester is present in the flame retardant composition, either in the presence or absence of a phosphite compound, the amount of epoxy-containing compound is most effective when adjusted as follows: i) when the flame retardant polymer composition comprises an aromatic phosphate ester flame retardant and a phosphite, the amount of epoxy-containing compound present is such that the total epoxy functional group equivalent weight is at least about 32 milliequivalents per kg of the combined weight of the one or more copolyetherester thermoplastic elastomers and the aromatic phosphate ester flame retardant and ii) when the flame retardant polymer composition comprises an aromatic phosphate ester flame retardant in the absence of phosphite, the amount of epoxy-containing compound present is such that the total epoxy functional group equivalent weight is at least about 56 milliequivalents per kg of the combined weight of the one or more copolyetherester thermoplastic elastomers and the aromatic phosphate ester flame retardant.

The flame retardant polymer compositions described herein may further comprise additives that include, but are not limited to, one or more of the following components as well as combinations of these: metal deactivators, such as hydrazine and hydrazide; heat stabilizers; antioxidants; modifiers; colorants, lubricants, fillers and reinforcing agents, impact modifiers, flow enhancing additives, anti-static agents, crystallization promoting agents, conductive additives, viscosity modifiers, nucleating agents, plasticizers, mold release agents, scratch and mar modifiers, drip suppressants, adhesion modifiers and other processing aids known in the polymer compounding art. Preferably, the additives are selected from the group consisting of stabilizers, processing agents, metal deactivators, antioxidants, UV stabilizers, heat stabilizers, dyes and/or pigments. When used, additional additives are preferably present in amounts of about 0.05 to about 10 weight percent, based on the total weight of the flame retardant polymer composition.

The flame retardant polymer compositions described herein are melt-mixed blends, wherein all of the polymeric components are well-dispersed within each other and all of the non-polymeric ingredients are well-dispersed in and bound by the polymer matrix, such that the blend forms a unified whole. Any melt-mixing method may be used to combine the polymeric components and non-polymeric ingredients of the present invention.

The polymeric components and non-polymeric ingredients of the flame retardant polymer compositions of the invention may be added to a melt mixer, such as, for example, a single or twin-screw extruder; a blender; a single or twin-screw kneader; or a Banbury mixer, either simultaneously through a single step addition, or in a stepwise fashion, and then melt-mixed. When adding the polymeric components and non-polymeric ingredients in a stepwise fashion, a portion of the polymeric components and/or non-polymeric ingredients are first added and melt-mixed with the remaining polymeric components and non-polymeric ingredients being subsequently added and further melt-mixed until a well-mixed composition is obtained.

The flame retardant polymer compositions described herein may be shaped into articles using methods known to those skilled in the art, such as injection molding, blow molding, injection blow molding, extrusion, thermoforming, melt casting, vacuum molding, rotational molding, calendar molding, slush molding, filament extrusion and fiber spinning. Such articles may include films, fibers and filaments, wire and cable coatings; photovoltaic cable coatings, optical fiber coatings, tubing and pipes; fabrics or texiles made fibers and filaments, e.g., used in clothing or carpets; films and membranes such breathable membranes in roofing and building/construction; motorized vehicle parts such as body panels, air bag doors, dashboards, engine covers, rocker panels or air filter covers; components for household appliances, such as washers, dryers, refrigerators and heating-ventilation-air conditioning appliances; connectors in electrical/electronic applications; components for electronic devices, such as computers; components for office-, indoor-, and outdoor-furniture; and footwear components.

Preferably, the flame retardant polymer compositions of the present invention are used to make insulated wire and cable coatings such as insulated layers or jackets for cables and wires.

EXAMPLES

The invention is further illustrated by certain embodiments in the examples below which provide greater detail for the compositions, uses and processes described herein.
Materials The following materials were used to prepare the flame retardant polymer compositions described herein and the compositions of the comparative examples.

Copolyetherester Thermoplastic Elastomer 1 (TPC-1): a copolyetherester elastomer comprising about 7.8 weight percent of poly(tetramethylene oxide) having an average molecular weight of about 1000 g/mol as polyether block segments, the weight percentage being based on the total weight of the copolyetherester elastomer, the short chain ester units of the copolyetherester being polybutylene terephthalate segments. As required for the manufacturing process and well-known to those skilled in the art, the copolyetherester elastomer contained up to 6 weight percent of heat stabilizers, antioxidants and metal deactivators.

Copolyetherester Thermoplastic Elastomer 2 (TPC-2): a copolyetherester elastomer comprising about 26.4 weight percent of poly(tetramethylene oxide) copolymerized units having an average molecular weight of about 1000 g/mol as polyether block segments, the weight percentage being based on the total weight of the copolyetherester elastomer, the short chain ester units of the copolyetherester being polybutylene terephthalate segments. As required for the manufacturing process and well-known to those skilled in the art, the copolyetherester elastomer contained up to 6 weight percent of heat stabilizers, antioxidants and metal deactivators.

Copolyetherester Thermoplastic Elastomer 3 (TPC-3): a copolyetherester elastomer comprising about 15.9 weight percent of poly(tetramethylene oxide) having an average molecular weight of about 1000 g/mol as polyether block segments, the weight percentage being based on the total weight of the copolyetherester elastomer, the short chain ester units of the copolyetherester being polybutylene terephthalate and polybutylene isophthalate segments. As required for the manufacturing process and well-known to those skilled in the art, the copolyetherester elastomer contained up to 6 weight percent of heat stabilizers, antioxidants and metal deactivators.

Melamine cyanurate flame retardant (MC-1): Melapur®, melamine cyanurate, having a D98 max of 25 μm, supplied by BASF.

Melamine cyanurate flame retardant (MC-2): FT-6120 MC15, melamine cyanurate, having a D98 max of 15 μm, supplied by ICL Industrial Products.

Phosphinate flame retardant: Exolit® OP935, an aluminum salt of diethylene phosphinate having a D90 max of 7.506 microns, supplied by Clariant Corporation.

Epoxy-1: Epikote™ EP1002F, a 2,2-bis(4-hydroxyphenyl)propane-epichlorohydrin copolymer, supplied by Momentive Chemical Solutions; epoxy functional group equivalent weight of 600-700 g/eq.

Epoxy-2: Epon™ 1031, tetraglycidyl ether of tetraphenol ethane with a functionality of 3.5, supplied by Momentive Chemical Solutions; epoxy functional group equivalent weight of 195-230 g/eq.

Phosphite: Doverphos® S9228T, a Bis (2,4-dicumylphenyl)pentaerythritol diphosphite containing up to 2% triisopropanolamine, supplied by Dover Chemical Corporation.

Phosphate-1: PX-200, a resorcinol bis(di-2,6-dimethylphenyl phosphate), supplied by Daihachi Chemical Industry Corporation.

Phosphate-2: PX-202, a bisphenol bis(di-2,6-dimethylphenyl phosphate), supplied by Daihachi Chemical Industry Corporation.

In Tables 1-2, compositions of the Examples are identified as "E" and compositions of the Comparative Examples are identified as "C".
Preparative Methods Flame retardant polymer compositions of the invention and comparative compositions were prepared as follows: the above described materials, in the amounts listed in Tables 1 and 2, were melt blended in a twin screw extruder. The compounded melt blended mixtures of comparative examples C4, C5 and of all examples were extruded in the form of laces or strands, cooled in a water bath, chopped into granules and placed in sealed aluminum lined bags in order to prevent moisture pick-up.

Comparative example C1-C3 compositions, containing copolyetherester copolymers TPC-1 and TPC-2 in a weight ratio of 4:1, without any flame retardant, and without any epoxy-containing compound (Sample C1) or containing epoxy-containing compound (Samples C2 and C3) in the amounts listed in Table 1, were melt extruded in narrow flat strips on a standard extruder operated at a barrel temperature of 225° C.

The comparative example C5 composition, containing the same copolyetherester copolymer blend as comparative examples C1-C3, and in addition containing melamine cyanurate MC-1 and phosphate-1 in the amounts shown in Table 2, was melt blended in a 16 mm twin screw extruder (Prism 16) operated at a barrel temperature of about 240° C., a screw speed of about 300 rpm and a throughput of about 1 kg/hr.

Comparative examples C6-C8 compositions, containing the same copolyetherester copolymer blend, slightly lower amounts of melamine cyanurate MC-1 and phosphate-1 as the comparative example C5, and in addition containing epoxy-containing compound and phosphite materials in the amounts listed in Table 2, were melt extruded in narrow flat strips on a standard extruder operated at a barrel temperature of 225° C.

Example E1-E9 compositions, containing the same copolyetherester copolymer blend as comparative examples C5-C8, melamine cyanurate flame retardant MC-2 and epoxy-1 in the amounts listed in Tables 1 and 2, were melt blended in a 30 mm twin screw extruder (ZSK 30 mm) operated at a barrel temperature of 230° C., a screw speed of about 250 rpm and a throughput of 13-17 kg/hr. In addition, example E1-E9 compositions contained epoxy-2 and/or phosphite in the amounts listed in Tables 1 and 2. The Example E3 composition contained copolyetherester elastomer TPC-3 instead of TPC-2. Examples E1-E3 further contained a phosphate flame retardant.

Example E10-E22 and comparative example C4 compositions, containing similar compositions as examples E1-E9 but with varying levels of materials in the amounts listed in Tables 1 and 2, were melt blended in a 30 mm twin screw extruder (ZSK 30 mm) operated at a barrel temperature of 230° C., a screw speed of about 200 rpm and a throughput of 11-16 kg/hr. Comparative example C4 did not contain melamine cyanurate flame retardant but instead contained phosphinate flame retardant.

Test Methods

Flammability testing was performed according to UL 94 test standard, 20 mm vertical burning test. Test specimens were formed from the compositions of the invention (Samples E1-E22) and from a comparative composition (Sample C4) by injection molding the compositions in the form of test bars having dimensions of 125 mm long by 13 mm wide and a thickness of 0.8 mm. Prior to injection molding, the granules of the flame retardant compositions prepared according to the above-described methods were dried to provide granulated compositions having a moisture level below 0.08 percent. For comparative compositions C6-C8, test specimens were formed by cutting test specimens from an extruded flat strip in the form of test bars having dimensions of 125 mm long by 13 mm wide and a thickness of 1.8 mm. Before measurement, the test specimens were conditioned for 48 hours at 23° C. and 50% relative humidity. Test specimens were clamped with the longitudinal axis of the specimen in the vertical direction, so that the lower end of the specimen was 300 mm above a horizontal layer of dry absorbent surgical cotton. A burner producing a blue flame 20 mm high was placed so that the flame was applied centrally to the mid-point of the bottom edge of the specimen for 10 seconds. After the application of the flame to the specimen for 10 seconds, the burner was withdrawn from the sample and the after-flame time, t1, was measured. When after-flaming of the test specimen ceased, the burner was again placed beneath the specimen for an additional 10 seconds. The flame was then withdrawn from the test specimen and the second after-flame time, t2, was measured. Materials are classified according to the test specifications as V-0, V-1 or V-2, based on the behavior of the material during burning, V-2 being the least demanding classification. When the composition failed to meet the criteria for the least demanding classification (V-2), it is reported as "failed" in the tables.

Mechanical property measurement was conducted as follows. Prior to injection molding, the granules of the flame retardant compositions of the invention (Samples E1-E22) and from a comparative composition (Sample C4) prepared according to the above-described method were dried to provide granulated compositions having a moisture level below 0.08 percent. Tensile stress at break and elongation at break were measured according to the method ISO 527 using injection molded ISO tensile bar 5A samples of thickness of 2 mm for the compositions of the invention (Samples E1-E22) and comparative composition (Sample C4), or cutting 5A tensile bar specimen from an extruded flat strip for comparative compositions C1-C3 and C6-C8. The length of the tensile bars was 75 mm and the test speed was 50 mm/min.

Electrical performance measurement was conducted as follows. Test specimens were formed from the compositions of the invention (Samples E1-E22) and from comparative composition (Sample C4) by injection molding the compositions in the form of plaques having dimensions of 100 mm by 100 mm wide and a thickness of 1.0 mm. For comparative compositions C1-C3, C5 and C6-C8, test specimens were formed by compression molding the compositions in the form of plaques having the same dimensions as for the compositions of the invention. The volume resistivity of the molded plaques was measured after submitting the plaques to different conditioning treatments:
  (i) Volume resistivity in air at 23° C.: The plaques were allowed to rest at least 16 hrs at room temperature after molding. Volume resistivity from such plaques was measured in air at room temperature according to IEC 60093 by applying a DC potential of 500 V for 60 seconds prior to each reading. The duration of each reading was 60 seconds.
  (ii) Volume resistivity after submersion in water: Each polymer plaque to be measured was brought into contact with a copper plate of the same dimensions as the polymer plaque and they were pressed together by means of mechanical screws. The polymer-copper plaques were immersed in a closed water bath placed in a heated oven at 75° C. for 1 day, 7 days or 14 days respectively. The volume resistivity from the polymer plaques was measured immediately upon removal from the water bath.

Compositions of the invention have good flammability performance of at least V-2 at a thickness of 0.8 mm, elongation at break of at least 30%, and good electrical insulation performance as follows: (i) volume resistivity in air at 23° C. greater than or equal to 6000 GOhm.m and (ii) volume resistivity in water at 75° C. at any one between 1 and 14 days of greater than or equal to 500 GOhm.m. In the tables, compositions having volume resistivity of greater than 500 GOhm.m in water at 75° C. during 1, 7 or 14 days are reported as "Pass", the ones having volume resistivity of less than 500 GOhm.m in water at 75° C. during 1, 7 or 14 days are reported as "Fail".

The total epoxy functional group equivalent weight for each of the compositions is shown in the tables. For each individual epoxy-containing compound used the epoxy functional group equivalent weight (EEW) is the weight of the epoxy-containing compound over the number of epoxy groups in the molecule. Calculations were based on the average epoxy functional group equivalent weight: for Epoxy-1, 650 g/eq, and for Epoxy-2, 210 g/eq. For each composition the total epoxy functional group equivalent weight is provided per weight of the mixture of TPCs and phosphates, as $(A+B)/(w_{TPC-1}+w_{TPC-2}+w_{TPC-3}+w_{Phosphate-1}+w_{Phoshate-2})$, where $A=w_{epoxy-1}/EEW_{epoxy-1}$, $B=w_{epoxy-2}/EEW_{epoxy-2}$ and $w_i$ is the weight percent of the material i with respect to the total weight of the flame retardant polymer composition. In addition the total epoxy functional group equivalent weight per weight of the mixture of melamine cyanurate and phosphate flame retardants is provided as $(A+B)/(w_{MC-1}+w_{MC-2}+w_{Phosphate-1}+w_{Phoshate-2})$.

The data presented in Table 1 indicate that the comparative composition comprising only copolyetherester elastomers (Sample C1) exhibited good mechanical performance and good volume resistivity as reflected by a value of volume resistivity of greater than 6000 GOhm.m in air at 23° C. and greater than 500 GOhm.m in water at 75° C. during 14 days. The incorporation of epoxy-containing compounds in the composition of Sample C1 (Samples C2 and C3) retained a good performance. However compositions C1-C3 fail in flammability performance. The incorporation of melamine cyanurate flame retardant in the similar composition to comparative example C3 (Sample E4) surprisingly resulted in an improvement of the volume resistivity in air at 23° C. while it exhibited good volume resistivity during hydrolysis at 75° C. and a good flammability performance. This sample had a total epoxy functional group equivalent weight of 57.2 milliequivalent/kg TPC and 218 milliequivalent/kg MC. Further increase of the epoxy functional group equivalent weight (sample E5) maintained a good performance. Incorporation of a copolyetherester elastomer containing polybutylene isophthalate hard segments TPC-3 instead of the copolyetherester elastomer containing only polybutylene terephthalate hard segments to the composition of E5 (sample E13) or even at a lower TPC-1:TPC-3 weight ratio (sample E14) surprisingly resulted in a significant improvement of the volume resistivity in air at 23° C. while it presented good volume resistivity during hydrolysis at 75° C. and a good flammability performance. Examples E4-E5 and E13-E14 incorporating no phosphate and no phosphite had a total epoxy functional group equivalent weight of greater than 57.2 milliequivalent/kg of TPC and greater than 218 milliequivalent/kg MC Incorporation of a phosphite at a level of 0.3 weight percent to 1 weight percent in combination with epoxy-containing compounds surprisingly provided a further improvement of volume resistivity under all conditions while retaining good mechanical and flammability performance (Samples E6-E9 and E15-E17, E21). And presented a good performance even at a low total epoxy functional group equivalent weight of 32.8 milliequivalent/kg TPC and 123 milliequivalent/kg MC.

Incorporation of an organic phosphinate instead of melamine cyanurate in combination with epoxy-1 and epoxy-2 (comparative sample C4) resulted in good volume resistivity and flammability performance but the sample demonstrated poor extrudability performance even at a relatively low level of the epoxies, as indicated by a difficulty in extruding the composition and by a very low elongation at break of about 4%.

The data presented in Table 2 indicate that the comparative composition comprising only the flame retardant mixture of melamine cyanurate and phosphate-1 (Sample C5) exhibited an unacceptable volume resistivity upon only 1 day submersion in water at 75° C., as reflected by a value of volume resistivity of less than 500 GOhm.m. The incorporation of the epoxy-1 in the flame retardant composition incorporating melamine cyanurate and phosphate-1 at a level of 1.6 weight percent alone or with phosphite at a level of 0.3 weight percent or with epoxy-2 at a level of 0.4 weight percent (samples C6-C8) did not significantly improve the volume resistivity during hydrolysis at 75° C. failing the electrical insulation test. Comparative Examples C5-C8 had a total epoxy functional group equivalent weight of less than 55.8 milliequivalent/kg of the copolyetherester elastomer and phosphate mixture and less than 145.3 milliequivalent/kg of the melamine cyanurate and phosphate mixture. The incorporation of a higher level of total epoxy functional group equivalent weight in the mixture containing the melamine cyanurate and phosphate flame retardants provided a good volume resistivity under all conditions (all Examples E1-E3, E10-E12). Furthermore such compositions provided an advantageously good flammability performance (Samples E1-E3) and an advantageously good elongation at break (Samples all Examples E1-E3, E10-E12) compared to comparative examples C5-C8 and even compared to all examples in Table 1 incorporating melamine cyanurate only flame retardant. Incorporation of a copolyetherester elastomer containing polybutylene isophthalate hard segments TPC-3 instead of the copolyetherester elastomer containing only polybutylene terephthalate hard segments surprisingly resulted in a significant improvement of the volume resistivity in air at 23° C. while it presented good volume resistivity during hydrolysis at 75° C. and a good flammability performance (Samples E3, E10-E12). Examples E1-E3 and E10-E12 incorporating no phosphite had a total epoxy functional group equivalent weight of greater than 55.8 milliequivalent/kg of (TPC+phosphate) and greater than 145.3 milliequivalent/kg of (MC+phosphate). Incorporation of a phosphite at a level of 0.3 weight percent to 0.4 weight percent in combination with epoxy-containing compounds surprisingly provided a further improvement of volume resistivity under all conditions even at a lower total epoxy functional group equivalent weight compared to samples incorporating no phosphite while retaining good mechanical and flammability performance (Samples E18-E22).

TABLE 1

|  | C1 | C2 | C3 | E4 | E5 | E6 | E7 | E8 |
|---|---|---|---|---|---|---|---|---|
| TPC-1 | 75.4 | 74.2 | 74.1 | 61 | 59.7 | 59.5 | 60 | 59 |
| TPC-2 | 18.8 | 18.5 | 18.3 | 15.2 | 15 | 14.9 | 15.1 | 14.7 |
| TPC-3 |  |  |  |  |  |  |  |  |
| Heat Stabilizers/Metal Deactivators | 5.8 | 5.7 | 5.6 | 1.8 | 1.8 | 2.3 | 2.3 | 2.3 |
| Epoxy-1 |  | 1.6 | 1.6 | 1.6 | 3 | 3 | 1.6 | 3 |
| Epoxy-2 |  |  | 0.4 | 0.4 | 0.5 |  |  |  |
| Phosphite |  |  |  |  |  | 0.3 | 1 | 1 |
| MC-2 |  |  |  | 20 | 20 | 20 | 20 | 20 |
| Phosphinate |  |  |  |  |  |  |  |  |
| Total (weight percent) | 100 | 100 | 100 | 100 | 100 | 100 | 100 | 100 |
| TPC-1:TPC-2 (TPC-3) (wt/wt) | 4 | 4 | 4 | 4 | 4 | 4 | 4 | 4 |
| Epoxy functional group equivalent weight (meq per 100 g total) | 0 | 2.45 | 4.36 | 4.36 | 7.00 | 4.62 | 2.46 | 4.62 |

TABLE 1-continued

|  |  |  |  |  |  |  |  |  |
|---|---|---|---|---|---|---|---|---|
| Epoxy functional group equivalent weight (meq per kg (TPC + phosphate)) |  | 0 | 26.5 | 47.2 | 57.2 | 93.7 | 62.1 | 32.8 | 62.7 |
| Epoxy functional group equivalent weight (meq per kg (MC + phosphate)) |  | 0 | — | — | 218 | 350 | 231 | 123 | 231 |
| Tensile stress at break (MPa) |  | 41 | 33.4 | 39 | 24 | 22 | 23 | 20 | 22 |
| Elongation at break (%) |  | 466 | 347 | 429 | 33 | 39 | 36 | 41 | 34 |
| UL-V rating |  | Fail | Fail | Fail | V2 | V2 | V0 | V2 | V2 |
| Volume resistivity (1E2 GOhm·m)[1] |  |  |  |  |  |  |  |  |  |
| in air at 23° C. |  | 126 | 191 | 205 | 303 | 290 | 530 | 432 | 356 |
| in water at 75° C. | 1 day | Pass | Pass | Pass | Pass | Pass | Pass | Pass | Pass |
|  | 7 days | Pass | Pass | Pass | Pass | Pass | Pass | Pass | Pass |
|  | 14 days | Pass | Pass | Pass | Pass | Pass | Pass | Pass | Pass |

|  |  | E9 | E13 | E14 | E15 | E16 | E17 | E21 | C4 |
|---|---|---|---|---|---|---|---|---|---|
| TPC-1 |  | 61 | 59.7 | 49.7 | 59.5 | 59.5 | 49.4 | 59.8 | 61 |
| TPC-2 |  | 15.2 |  |  | 14.9 |  |  |  | 15.2 |
| TPC-3 |  |  | 15 | 25 |  | 14.9 | 25 | 15 |  |
| Heat Stabilizers/Metal Deactivators |  | 1.5 | 1.8 | 1.8 | 2.3 | 2.3 | 2.3 | 2.3 | 1.8 |
| Epoxy-1 |  | 1.6 | 3 | 3 | 3 | 3 | 3 | 2.3 | 1.6 |
| Epoxy-2 |  | 0.4 | 0.5 | 0.5 |  |  |  | 0.2 | 0.4 |
| Phosphite |  | 0.3 |  |  | 0.3 | 0.3 | 0.3 | 0.4 |  |
| MC-2 |  | 20 | 20 | 20 | 20 | 20 | 20 | 20 |  |
| Phosphinate |  |  |  |  |  |  |  |  | 20 |
| Total (weight percent) |  | 100 | 100 | 100 | 100 | 100 | 100 | 100 | 100 |
| TPC-1:TPC-2 (TPC-3) (wt/wt) |  | 4 | 4 | 2 | 4 | 4 | 2 | 4 | 4 |
| Epoxy functional group equivalent weight (meq per 100 g total) |  | 4.36 | 7.00 | 7.00 | 4.62 | 4.62 | 4.62 | 4.49 | 4.36 |
| Epoxy functional group equivalent weight (meq per kg (TPC + phosphate)) |  | 57.2 | 93.7 | 93.7 | 62.1 | 62.1 | 62.1 | 60.0 | 57.2 |
| Epoxy functional group equivalent weight (meq per kg (MC + phosphate)) |  | 218 | 350 | 350 | 231 | 231 | 231 | 225 | 218 |
| Tensile stress at break (MPa) |  | 23 | 21.8 | 20.1 | 21.6 | 19.5 | 19.3 | 20.5 | 33.1 |
| Elongation at break (%) |  | 38 | 41 | 55 | 40 | 46 | 74 | 43 | 4* |
| UL-V rating |  | V2 | V2 | V2 | V2 | V2 | V2 | V2 | V2 |
| Volume resistivity (1E2 GOhm·m)[1] |  |  |  |  |  |  |  |  |  |
| in air at 23° C. |  | 241 | 1096 | 755 | 348 | 222 | 691 | 1307 | 1341 |
| in water at 75° C. | 1 day | Pass | Pass | Pass | Pass | Pass | Pass | Pass | Pass |
|  | 7 days | Pass | Pass | Pass | Pass | Pass | Pass | Pass | Pass |
|  | 14 days | Pass | Pass | Pass | Pass | Pass | Pass | Pass | Pass |

[1]The designation 1E2 GOhm.m indicates that reported values are $10^{-2}$ times the measured value. For example, the reported value 126 is equivalent to a measured value of 12600.

TABLE 2

|  | C5 | C6 | C7 | C8 | E1 | E2 | E3 |
|---|---|---|---|---|---|---|---|
| TPC-1 | 52.8 | 53.3 | 52.7 | 52.9 | 51.8 | 51.8 | 51.8 |
| TPC-2 | 13.2 | 13.3 | 13.1 | 13.3 | 12.9 | 12.9 |  |
| TPC-3 |  |  |  |  |  |  | 12.9 |
| Heat stabilizers/Metal deactivators | 4.0 | 1.8 | 2.3 | 1.8 | 1.8 | 1.8 | 1.8 |
| Epoxy-1 |  | 1.6 | 1.6 | 1.6 | 3 | 3 | 3 |
| Epoxy-2 |  |  |  | 0.4 | 0.5 | 0.5 | 0.5 |
| Phosphite |  |  | 0.3 |  |  |  |  |
| MC-1 | 20 | 18 | 18 | 18 |  |  |  |
| MC-2 |  |  |  |  | 18 | 18 | 18 |

TABLE 2-continued

| | | | | | | | | |
|---|---|---|---|---|---|---|---|---|
| Phosphate-1 | | 10 | 12 | 12 | 12 | 12 | | |
| Phosphate-2 | | | | | | | 12 | 12 |
| Total (weight percent) | | 100 | 100 | 100 | 100 | 100 | 100 | 100 |
| TPC-1:TPC-2 (wt/wt) | | 4 | 4 | 4 | 4 | 4 | 4 | 4 |
| Epoxy functional group equivalent weight (meq per 100 g total) | | 0 | 2.46 | 2.46 | 4.36 | 7.00 | 7.00 | 7.00 |
| Epoxy functional group equivalent weight (meq per kg (TPC + phosphate)) | | 0 | 31.3 | 31.6 | 55.8 | 91.3 | 91.3 | 91.3 |
| Epoxy functional group equivalent weight (meq per kg (MC + phosphate)) | | 0 | 82 | 82 | 145.3 | 233 | 233 | 233 |
| Tensile stress at break (MPa) | | | 18.9 | 21.5 | 21.0 | 20 | 19 | 17 |
| Elongation at break (%) | | | 55.9 | 12.1 | 31.5 | 81 | 71 | 96 |
| UL-V rating | | | V2 | V2 | V2 | V0 | V0 | V0 |
| Volume Resistivity (1E2 GOhm · m)[1] | | | | | | | | |
| in air at 23° C. | | 78 | 37 | 56 | 39 | 57.8 | 60.9 | 570 |
| in water at 75° C. | 1 day | Fail | Fail | Pass | Pass | Pass | Pass | Pass |
| | 7 days | | Fail | Fail | Pass | Pass | Pass | Pass |
| | 14 days | | Fail | Fail | Fail | Pass | Pass | Pass |

| | | E10 | E11 | E12 | E18 | E19 | E20 | E22 |
|---|---|---|---|---|---|---|---|---|
| TPC-1 | | 51.8 | 51.8 | 43 | 51.5 | 51.5 | 43 | 51.9 |
| TPC-2 | | | | | | | | |
| TPC-3 | | 12.9 | 12.9 | 21.7 | 12.9 | 12.9 | 21.4 | 12.9 |
| Heat stabilizers/Metal deactivators | | 1.8 | 1.8 | 1.8 | 2.3 | 2.3 | 2.3 | 2.3 |
| Epoxy-1 | | 3 | 3 | 3 | 3 | 3 | 3 | 2.3 |
| Epoxy-2 | | 0.5 | 0.5 | 0.5 | | | | 0.2 |
| Phosphite | | | | | 0.3 | 0.3 | 0.3 | 0.4 |
| MC-1 | | | | | | | | |
| MC-2 | | 18 | 18 | 18 | 18 | 18 | 18 | 18 |
| Phosphate-1 | | | 12 | 12 | | 12 | 12 | 12 |
| Phosphate-2 | | 12 | | | 12 | | | |
| Total (weight percent) | | 100 | 100 | 100 | 100 | 100 | 100 | 100 |
| TPC-1:TPC-2 (wt/wt) | | 4 | 4 | 2 | 4 | 4 | 2 | 4 |
| Epoxy functional group equivalent weight (meq per 100 g total) | | 7.00 | 7.00 | 7.00 | 4.62 | 4.62 | 4.62 | 4.49 |
| Epoxy functional group equivalent weight (meq per kg (TPC + phosphate)) | | 91.3 | 91.3 | 91.3 | 60.5 | 60.5 | 60.5 | 58.4 |
| Epoxy functional group equivalent weight (meq per kg (MC + phosphate)) | | 233 | 233 | 233 | 154 | 154 | 154 | 150 |
| Tensile stress at break (MPa) | | 19.2 | 19.8 | 18.7 | 18.2 | 18.5 | 15.6 | 18 |
| Elongation at break (%) | | 75 | 125 | 272 | 85 | 104 | 140 | 92 |
| UL-V rating | | V2 | V2 | V2 | V2 | V2 | V2 | V2 |
| Volume Resistivity (1E2 GOhm · m)[1] | | | | | | | | |
| in air at 23° C. | | 1440 | 345 | 166 | 1044 | 279 | 129 | 202 |
| in water at 75° C. | 1 day | Pass | Pass | Pass | Pass | Pass | Pass | Pass |
| | 7 days | Pass | Pass | Pass | Pass | Pass | Pass | Pass |
| | 14 days | Pass | Pass | Pass | Pass | Pass | Pass | Pass |

[1]The designation 1E2 GOhm.m indicates that reported values are $10^{-2}$ times the measured value. For example, the reported value 126 is equivalent to a measured value of 12600.

What is claimed is:

1. A flame retardant polymer composition consisting of:
   a. one or more copolyetherester thermoplastic elastomers;
   b. at least 10 weight percent of melamine cyanurate;
   c. one or more epoxy-containing compounds; and optionally
   d. 0 to 2 weight percent of a phosphite;
   e. 0 to 15 weight percent of an aromatic phosphate ester flame retardant, with the proviso that i) when the flame retardant polymer composition comprises an aromatic phosphate ester flame retardant and a phosphite, the amount of epoxy-containing compound present is such that the total epoxy functional group equivalent weight is at least about 32 milliequivalents per kg of the combined weight of the one or more copolyetherester thermoplastic elastomers and the aromatic phosphate ester flame retardant and ii) when the flame retardant polymer composition comprises an aromatic phosphate ester flame retardant in the absence of phosphite, the amount of epoxy-containing compound present is such that the total epoxy functional group equivalent weight is at least about 56 milliequivalents per kg of the combined weight of the one or more copolyetherester thermoplastic elastomers and the aromatic phosphate ester flame retardant; and f. from 0.05 to 10 weight percent of one or more additives selected from the group consisting of stabilizers, metal deactivators, antioxidants, UV stabilizers, heat stabilizers, dyes, and pigments;

wherein the weight percentages of components a) to f) are based on the total weight of the flame retardant polymer composition, and wherein the sum of the weight percentages of components a) to f) is 100 weight percent.

2. A flame retardant polymer composition according to claim 1, wherein the one or more copolyetherester thermoplastic elastomers are copolyetherester elastomers having a multiplicity of recurring long-chain ester units and short-chain ester units joined head-to-tail through ester linkages, said long-chain ester units being represented by formula (A):

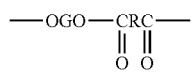

(A)

and said short-chain ester units being represented by formula (B):

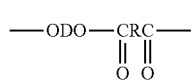

(B)

wherein:

G is a divalent radical remaining after the removal of terminal hydroxyl groups from poly(alkylene oxide) glycols having a number average molecular weight of between about 400 and about 6000;

R is a divalent radical remaining after removal of carboxyl groups from a dicarboxylic acid having a molecular weight of less than about 300; and D is a divalent radical remaining after removal of hydroxyl groups from a diol having a molecular weight less than about 250.

3. A flame retardant polymer composition according to claim 1, wherein the one or more copolyetherester thermoplastic elastomers are prepared from monomers comprising (1) poly(tetramethylene oxide) glycol or poly(trimethylene oxide) glycol and mixtures thereof; (2) a dicarboxylic acid selected from the group consisting of isophthalic acid, terephthalic acid and mixtures thereof; and (3) a diol selected from the group consisting of 1,4-butanediol, 1,3-propanediol and mixtures thereof.

4. A flame retardant polymer composition according to claim 1, wherein the one or more copolyetherester thermoplastic elastomers are prepared from monomers comprising (1) poly(tetramethylene oxide) glycol; (2) terephthalic acid; and (3) a diol selected from the group consisting of 1,4-butanediol, 1,3-propanediol and mixtures thereof; and wherein the level of poly(tetramethylene oxide) glycol is less than about 25 weight percent based on the total weight of the copolyetherester elastomers.

5. A flame retardant polymer composition according to claim 4, further comprising at least one copolyetherester thermoplastic elastomer prepared from monomers comprising (1) poly(tetramethylene oxide) glycol; (2) a dicarboxylic acid selected from the group consisting of mixtures of isophthalic acid and terephthalic acid; and (3) a diol selected from the group consisting of 1,4-butanediol, 1,3-propanediol and mixtures thereof and wherein the level of said copolyetherester elastomer is from about 5 to about 50 weight percent based on the total weight of the copolyetherester elastomers.

6. A flame retardant polymer composition according to claim 1, wherein the amount of melamine cyanurate b) is from about 10 to 30 weight percent.

7. A flame retardant polymer composition according to claim 1, wherein the amount of epoxy-containing compound c) is such that it provides from at or about 2.4 to about 10 milliequivalents of total epoxy functionality based on hundred grams of the total weight of the flame retardant polymer composition.

8. A flame retardant polymer composition according to claim 1, said flame retardant polymer composition comprising the phosphite, and wherein the phosphite is present in an amount of about 0.1 to 1 weight percent.

9. A flame retardant polymer composition according to claim 1, said flame retardant polymer composition comprising the aromatic phosphate ester, and wherein the aromatic phosphate ester is present in an amount of about 2 to 12 weight percent.

10. A flame retardant polymer composition according to claim 1, wherein the epoxy-containing compound c) is selected from the group consisting of 2,2-bis(4-hydroxyphenyl)propane-epichlorohydrin copolymer and tetraglycidyl ether of tetraphenol ethane, and a combination of 2,2-bis(4-hydroxyphenyl)propane-epichlorohydrin copolymer and tetraglycidyl ether of tetraphenol ethane.

11. A flame retardant polymer composition according to claim 1, comprising a pentaerythritol diphosphite.

12. A flame retardant polymer composition according to claim 1, comprising an aromatic phosphate ester selected from the group consisting of resorcinol bis(di-2,6-dimethylphenyl phosphate) and bisphenol bis(di-2,6-dimethylphenyl phosphate), and a combination of resorcinol bis(di-2,6-dimethylphenyl phosphate) and bisphenol bis(di-2,6-dimethylphenyl phosphate).

* * * * *